US006811639B1

(12) United States Patent
Chaplinsky, Jr. et al.

(10) Patent No.: US 6,811,639 B1
(45) Date of Patent: Nov. 2, 2004

(54) PROCESS FOR SEALING CRIMPS IN OIL FILTERS

(75) Inventors: Paul Chaplinsky, Jr., Middletown, CT (US); James A. Serenson, Bristol, CT (US)

(73) Assignee: Henkel Corporation, Rocky HIll, CT (US)

( * ) Notice: Subject to any disclaimer, the term of this patent is extended or adjusted under 35 U.S.C. 154(b) by 266 days.

(21) Appl. No.: 10/132,192

(22) Filed: Apr. 26, 2002

(51) Int. Cl.⁷ .............................................. B01D 27/08
(52) U.S. Cl. ................ 156/196; 156/275.5; 156/275.7; 210/348; 210/398
(58) Field of Search ................................. 156/183, 196, 156/272.2, 275.5, 275.7; 210/348, 398; 53/331, 366

(56) References Cited

U.S. PATENT DOCUMENTS

| | | | | |
|---|---|---|---|---|
| 4,380,346 A | * | 4/1983 | Davis et al. ................ 280/736 |
| 5,028,330 A | * | 7/1991 | Caronia et al. .......... 210/493.2 |
| 5,122,218 A | * | 6/1992 | Lapp et al. .................. 156/350 |
| 5,698,059 A | * | 12/1997 | Bilski et al. .............. 156/273.5 |
| 5,830,349 A | | 11/1998 | Roll et al. ................... 210/131 |
| 6,096,199 A | * | 8/2000 | Covington .................. 210/130 |
| 6,468,425 B2 | * | 10/2002 | Reinhart ...................... 210/232 |
| 6,497,692 B1 | * | 12/2002 | Tameishi et al. ....... 604/385.02 |

FOREIGN PATENT DOCUMENTS

| | | | | |
|---|---|---|---|---|
| DE | | 3813628 A1 | * 11/1989 | ........... B01D/27/08 |
| EP | | 180768 A2 | * 5/1986 | ........... B01D/27/08 |
| WO | WO 00/40663 | | 7/2000 | .............. C09J/4/00 |

* cited by examiner

Primary Examiner—Jeff H. Aftergut
Assistant Examiner—John T. Haran
(74) Attorney, Agent, or Firm—Steven C. Bauman

(57) ABSTRACT

A process for producing a sealed crimp joint between two substrates, each substrate having a predefined crimp area utilized to form the crimp joint. The process includes the steps of:
  a) applying a photocurable sealant composition to a portion of the crimp area of at least one of the substrates,
  b) irradiating the photocurable sealant in place on the substrate to fully cure the sealant, and then
  c) forming a crimp joint between the two substrates utilizing the respective crimp areas thereof.

The process is suitable for forming crimp joints between housing parts of an oil filter.

21 Claims, 2 Drawing Sheets

PROCESS FOR SEALING CRIMPS IN OIL FILTERS

BACKGROUND OF THE INVENTION

Oil filter cartridges used in automobile engines and other internal combustion engines employ annular filter elements mounted in filter housings which are threadably mounted on the engine. These cartridges are known as "spin-on filters" because they are threadably mounted and removable. Flow paths, housing size, filter media type and location and valving systems vary, but most share several housing features, including a shell and nutplate construction, joined together by a crimp joint. U.S. Pat. Nos. 6,096,199 and 5,830,349 describe filter cartridges sharing such a housing construction.

Oil filter crimps are traditionally sealed using anaerobic adhesives, heat cure adhesives (epoxies, urethanes, etc . . . ) and/or solvent based adhesives. These materials are dispensed onto one component that will form the crimp. That component is then assembled with the second component, crimped, exposed to a heat cure to accelerate the adhesive's cure, pressure tested as a quality audit, then allowed to condition at room temperature to continue to cure if necessary. Lot sampling is then used to pressure test the assemblies with oil under pressure to confirm the quality of the oil filters.

This process has several limitations. First, the adhesives are normally high viscosity, de-aerated materials dispensed in a bead so that they will not migrate during crimping. If the adhesive is dispensed in the wrong location, or there are air bubbles in the product, leak paths can exist that will compromise the quality of the product. Also, if there is any surface contaminants that compromise adhesion or inhibit cure, the oil filters can leak. These failure modes can only be detected after assembly and are difficult to inspect for because the adhesive is confined mechanically in a difficult to assemble crimp.

SUMMARY OF THE INVENTION

The present invention, in one aspect is a process for producing a sealed crimp joint between two substrates, each substrate having a predefined crimp area utilized to form the crimp joint. The process includes the steps of:
a) applying a photocurable sealant composition to a portion of the crimp area of at least one of the substrates,
b) irradiating the photocurable sealant in place on the substrate to cure the sealant to an immobile condition, and then
c) forming a crimp joint between the two substrates utilizing the respective crimp areas thereof.
The process is suitable for forming crimp joints between housing parts of an oil filter.

The photocuring process is a more robust process that allows for quality audits before assembly and crimp. This will reduce internal failure cost (e.g. scrap and rework), external failure costs (e.g. warranty and loss of goodwill), prevention costs (e.g. troubleshooting) and auditing costs (labor for inspection). To facilitate audit inspections, a colorant, phosphorescing and/or fluorescing agent may be included in the sealant formulations.

When the sealant is fully cured before assembly, the seal produced is essentially a compression gasket seal, rather than an adhesive seal. Accordingly the sealed joints so produced are novel products and as such constitute a further aspect of the invention.

DETAILED DESCRIPTION

As used herein the sealant is considered immobilized when its surface is non-flowable and dry to the touch. The sealant is fully cured when it has cured solid through to the depth of the substrate. In either case, unreacted curable groups may remain in the formulation as it is well known that solidification of photocurable materials usually occurs with some fraction of the curable groups remaining unreacted.

All published documents, including all US patent documents, mentioned anywhere in this application are hereby expressly incorporated herein by reference in their entirety. Any copending patent applications, mentioned anywhere in this application are also hereby expressly incorporated herein by reference in their entirety.

Figure 1:
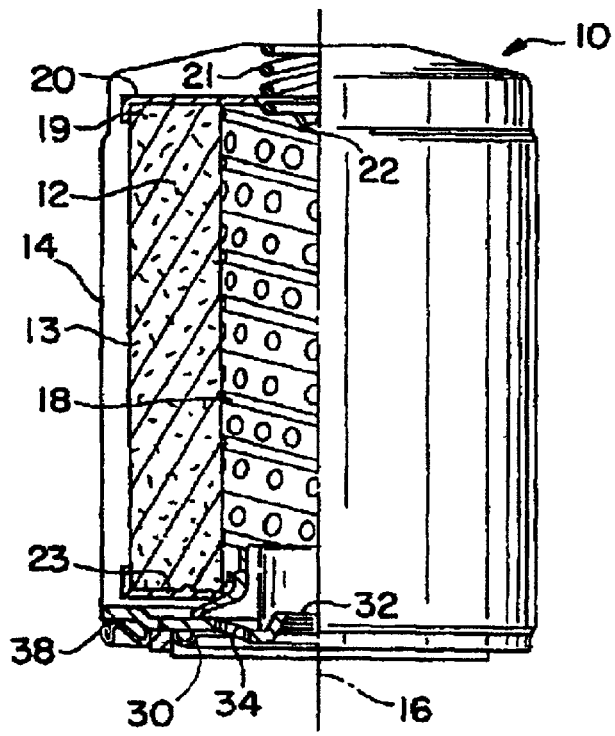
FIG. 1 is a side view, partially in section, of one type of a filter cartridge which may be constructed using the improved method and crimp seal of the present invention.

Referring now to FIG. 1, there is shown a lubricating oil filter cartridge 10, of the type described in U.S. Pat. No. 6,096,199, wherein the cartridge comprises an annular filter element 12 configured of a conventional pleated paper filter media 13, or some other filter material, contained within a cylindrical shell 14. The annular filter element 12 is concentric with respect to an axis 16 of the cartridge 10 and has a hollow core 18.

The annular filter element 12 has a first end 19 configured as a closed, dished end cap 20 which is abutted by a spring 21 that is seated in a depression 22 within the closed, dished end cap. At the second end of the annular filter element 12, there is an annular end cap 23.

A nutplate 30 encloses the filter element 12 in the housing 14. The nutplate 30 includes a threaded outlet 32, coaxial with the axis 16 of the filter cartridge 10 and a plurality of inlet openings 34 (only one of which is shown) disposed in spaced relation with one another around the axis 16 of the cartridge 10. The nutplate 30 is attached to the bottom end of the shell 14 by a peripheral crimp 38.

Figure 2:
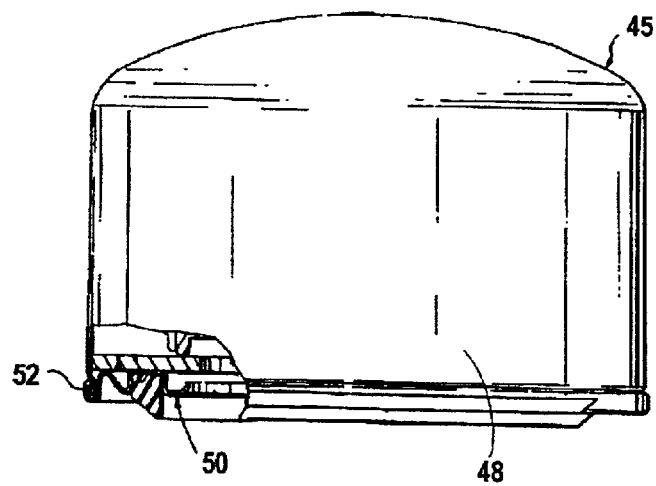
FIG. 2 is an external side view, with parts cut away, of a second oil filter cartridge which may be constructed using the improved method and crimp seal of the present invention.

FIG. 2 depicts another type of filter cartridge 45, such as described in U.S. Pat. No. 5,830,349, which may be constructed in accordance with the invention. The filter cartridge 45 includes a housing comprising a shell 48 and a nutplate 50 joined circumferentially at crimp 52.

In a conventional process the oil filter crimp is sealed with a curable or solvent based adhesive/sealant formulation and the joint assembled before the formulation sets up. According to the present invention, a photocurable adhesive or sealant formulation is applied to the crimp area of one or both of the substrates to be joined and irradiated with energy of suitable wavelength, time and intensity to cure the formulation to the immobile state, preferably to the fully cured state. The irradiation energy is suitably light of UV or visible wavelengths, but may also be another energy source such as IR, X-ray, e-beam or the like. The substrates are then joined to form the crimp joint in conventional manner.

The sealant may also be formulated to have a secondary cure mechanism so that the material can continue to cure after immobilization. Such a secondary cure mechanism can be a moisture cure mechanism, for instance provided by free isocyanate groups or by silicone or organic components having one or more hydrolyzable groups bound to silicon atoms. Other secondary cure mechanisms may be cationic, anaerobic or heat cure mechanisms.

Figure 3:
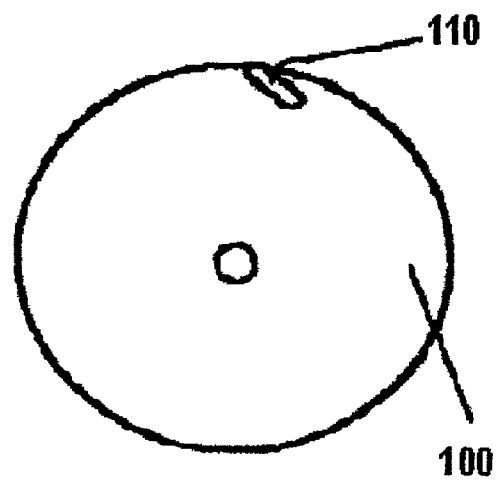
FIG. 3 is a schematic top view of a spray apparatus for applying a photocurable sealant to a filter cartridge nutplate.
Figure 4:
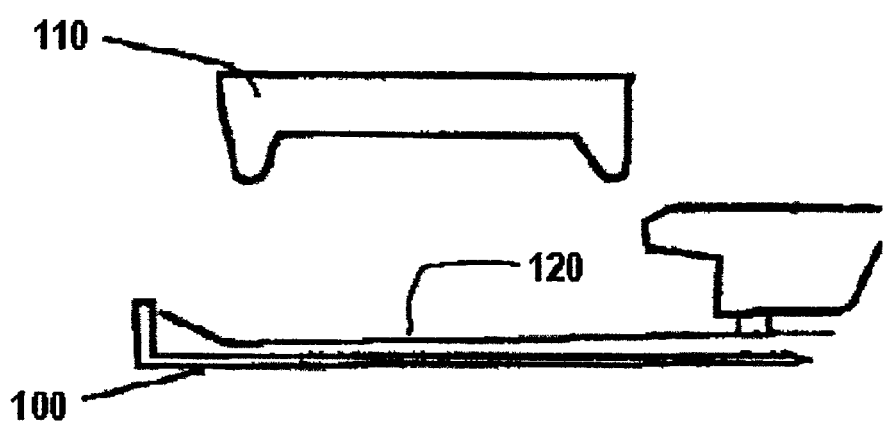
FIG. 4 is a schematic side view of a portion of a spray apparatus as in FIG. 3, with a nutplate in place thereon.

Referring to FIGS. 3 and 4, an apparatus for spray application of a photocurable sealant to a nutplate of an oil filter housing in accordance with the present invention is shown. As shown in FIG. 3, a rotary table 100 is provided, upon which a nutplate blank may be mounted. Near the peripheral edge of the table, a spray head 110 is located above the table, suitably offset about 45° from the table radius.

FIG. 4 shows the spray apparatus with a nutplate 120 mounted on the rotary table 100. Spray head 110 is positioned to apply an annular ring of a suitable low viscosity photocurable sealant to a designated area below the spray head as the nutplate 120 is rotated thereunder. Spray rate, spray time and table rotation rate are coordinated to provide a uniform circular stripe of sealant located within the area of the nutplate which will be used to form the crimp joint. The nutplate 120 is then transferred to a photocuring station where it is exposed to irradiation for a sufficient time to fully cure the sealant. At this point the nutplate may be inspected for sealant integrity prior to crimp assembly with a filter housing shell.

It should be understood that the apparatus of FIGS. 3 and 4 is illustrative only. Many other spray devices may be used. In fact any other device which can produce a thin film application of the sealant localized in the crimp area may be used in some embodiments of the invention. Examples of such applicators include liquid dispensing valves, extrusion applicators, screen printing applicators, stencils, and the like.

The ability of the joints to be effectively sealed using a fully cured formulation is a surprising feature of the invention as it would have been expected that the sealant should be viscous but flowable during curing so as to assure gap filling.

The use of a photocurable adhesive/coating to seal oil filter crimps offers many improvements over the traditional manufacturing processes. In various embodiments one or more of the following improvements are found. The photocuring process (1) is insensitive to air bubbles that are in the bulk adhesive or formed during assembly and crimping, (2) eliminates the potential for chemical cure inhibition, (3) makes the part less sensitive to failures caused by surface contaminants which decrease adhesion because the crimp is sealed with a compression gasket versus a formed-in-place gasket, (4) makes the process less sensitive to dispensing in the wrong location, (5) allows for a quality inspection on one sub-component before assembly, (6) is more environmentally friendly than solvent based products, and (7) allows for work up of an inventory of cured-in-place gasketed nutplates. Pre-assembly inspection of the cured-in-place sealant can confirm presence, location, thickness and/or cure depth of the sealant and can more readily be adapted to identify surface or sealant contamination problems which may lead to failure of the joint seal at a much earlier stage of the assembly process.

In the photocuring process of the invention, a low viscosity photocurable sealant, is sprayed or otherwise dispensed onto the part, allowed to flow into a thin film and then fully cured before assembly with the second crimp component. Since a low viscosity product is used and it forms a thin film over the entire crimp footprint, air bubbles are not a concern and the process is not as sensitive to dispensing in the wrong location. Further, since the sealant will be fully cured prior to assembly, quality inspections may be performed on the sub-component before assembly. Inspection before assembly allows for quicker response to process problems and facilitates investigation of assignable causes when process shifts occur. This will result in decreased internal failure costs (e.g. for scrap and rework), external failure costs (e.g. for warranty claims), prevention costs (e.g. troubleshooting and down time labor), and auditing costs (e.g. labor for inspection).

The sealants are suitably non-volatile materials which cure to substantially 100% solids and do not evaporate. Sealants which require evaporation have a potential to develop voids during drying.

In preferred embodiments the photocurable sealant formulation has a viscosity of from 10 to 100,000 cps (mPa.s), more preferably 100 to 100,000 cps (mpa.s). Suitably the coating thickness is from 0.001 inches to 0.020 inches (0.025 mm to 0.51 mm), more preferably from about 0.003 to about 0.010 inches (0.08 mm to 0.25 mm), and more preferably from 0.005 inches to 0.006 inches (0.13 mm to 0.15 mm).

Preferred photocurable sealants are (meth)acrylate adhesive or sealant compositions formulated with a free radical photoinitiator for UV curing. Many such formulations are commercially available. A preferred example is LOCTITE[7] 3102. Other photocurable sealants may also be employed in the inventive method, for instance low viscosity cationically photocurable epoxy, vinyl ether or styryloxy formulations, or photocurable thiol-ene (including "thiol-nene") formulations. The sealant may be based on an organic polymer backbone, a silicone polymer backbone or a mixture of two or more thereof. The formulation may be provided with a colorant, fluorescent agent or phosphorescent agent to facilitate inspection of the immobilized sealant prior to assembly.

The preferred photocurable (meth)acrylate sealant formulations will include at least one (meth)acrylate ester compound. Most formulations will desirably contain several such compounds. Such compounds include a wide variety of materials represented by $(H_2C=CR^1CO_2)_nR^2$, where $R^1$ may be hydrogen, halogen or alkyl of 1 to about 4 carbon atoms, n is a positive number of at least 1 and $R^2$ is any n-valent organic group. $R^2$ may be, for instance, alkyl, cycloalkyl, alkenyl, cycloalkenyl, alkaryl, aralkyl or aryl groups of 1 to about 16 carbon atoms, any of which may be optionally substituted or interrupted as the case may be with silane, silicon, oxygen, halogen, carbonyl, hydroxyl, ester, carboxylic acid, urea, urethane, carbamate, amine, amide, sulfur, sulfonate, sulfone and the like.

More specific (meth)acrylate compounds which may be included in the photocurable sealants include polyethylene glycol di(meth)acrylates, bisphenol-A di(meth)acrylates, such as ethoxylated bisphenol-A methacrylate ("EBIPMA") and tetrahydrofuran (meth)acrylates and di(meth)acrylates, hydroxypropyl (meth)acrylate, hexanediol di(meth)acrylate, trimethylol propane tri(meth)acrylate, ethoxylated trimethylol propane tri(meth)acrylates, (meth)acrylated polyesters and an acrylate ester corresponding to the structure shown below:

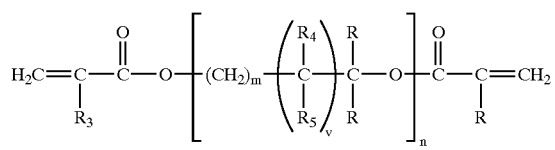

where $R^3$ may be selected from hydrogen, alkyl of 1 to about 4 carbon atoms, hydroxyalkyl of 1 to about 4 carbon atoms or

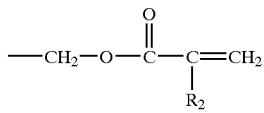

$R^4$ may be selected from hydrogen, halogen, and alkyl of 1 to about 4 carbon atoms;

$R^5$ may be selected from hydrogen, hydroxy and

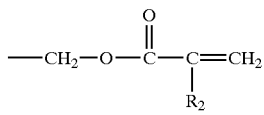

m is an integer equal to at least 1, e.g., from 1 to about 8 or higher, for instance, from 1 to about 4;

n is an integer equal to at least 1, e.g., 1 to about 20 or more; and v is 0 or 1.

Of course, combinations of these (meth)acrylate ester monomers may also be used. Suitable (meth)acrylate monomers include mono, di, or poly(meth)acrylate compounds, examples of which are β-carboxyethyl acrylate, isobornyl acrylate, ethyl acrylate, propyl acrylate, n-octyl acrylate, n-decyl acrylate, cyclohexyl acrylate, tetrahydrofurfuryl acrylate, 2-ethylhexyl acrylate, ethoxyethoxyethyl acrylate, ethoxylated phenyl monoacrylate, hydroxyethyl acrylate, hydroxypropyl acrylate, hydroxybutyl acrylate, isooctyl acrylate, n-butyl acrylate, isobutyl acrylate, neopentyl glycol diacrylate, ethylene glycol diacrylate, diethylene glycol diacrylate, dipropylene glycol diacrylate, triethylene glycol diacrylate, tetraethylene glycol diacrylate, 1,6-hexane diol diacrylate, tripropylene glycol diacrylate, glycerol triacrylate, trimethylol propane diacrylate, trimethylol propane triacrylate, pentaerythritol tetraacrylate, phenoxyethyl acrylate, methyl methacrylate, ethyl methacrylate, propyl methacrylate, n-butyl methacrylate, isobutyl methacrylate, hydroxyethyl methacrylate, hydroxypropyl methacrylate, cyclohexyl methacrylate, glycerol mono-methacrylate, glycerol 1,3-dimethacrylate, trimethyl cyclohexyl methacrylate, methyl triglycol methacrylate, isobornyl methacrylate, trimethylolpropane trimethacrylate, neopentyl glycol dimethacrylate, ethylene glycol dimethacrylate, diethylene glycol dimethacrylate, 1,6-hexanediol dimethacrylate, hydroxybutyl methacrylate, tetrahydrofurfuryl methacrylate, phenoxyethyl methacrylate, polyethylene glycol dimethacrylate and so forth.

Various adhesion promoters may be used in the photocurable sealants employed in the invention. Adhesion promoters may include acid functional monomers such as acrylic acid or methacrylic acid, and silane adhesion promoters such as glycidoxypropyltrimethoxysilane, methacryloxypropyltrimethoxysilane, methacryloxypropyltriacetoxysilane, and acryloxypropyltrimethoxysilane, and various unsaturated nitrogen-containing compounds such as N,N'-dimethylacrylamide, acryloyl morpholine, and the adhesion promoters described in WO 00/40663, for instance N-methyl-N-vinyl acetamide, N-vinyl caprolactam, N-vinylphthalimide, Uracil, and N-vinylpyrrolidone. Adhesion promoters may be used alone or in combination. The adhesion promoter or promoters may suitably be employed in the curable formulations in an amount from about 0.5% to about 30% by weight of the composition, more typically 1% to about 20% by weight, and particularly about 2% to about 10% by weight Desirably the photocurable sealant is formulated to have flexible to semi-flexible cured properties, for instance a flexural modulus, per ASTM D882, of about 120,000 psi or less, suitably from about 50 to about 90,000 psi, and more suitably about 500 to about 60,000 psi.

A photoinitiator component will also typically be included. The photoinitiators are active in the UV/visible range, approximately 250–850 nm, or some segment thereof. Examples of photoinitiators, which initiate under a free radical mechanism, include benzophenone, acetophenone, chlorinated acetophenone, dialkoxyacetophenones, dialkylhydroxyacetophenones, dialkylhydroxyacetophenone esters, benzoin, benzoin acetate, benzoin alkyl ethers, dimethoxybenzoin, dibenzylketone, benzoylcyclohexanol and other aromatic ketones, acyloxime esters, acylphosphine oxides, acylphosphonates, ketosulfides, dibenzoyldisulphides, diphenyldithiocarbonate and diphenyl(2,4,6-trimethylbenzoyl)phosphine oxide. The photoinitiators that may be used in the adhesive compositions of the present invention include photoinitiators available commercially from Ciba-Geigy Corp., Tarrytown, N.Y. under the "IRGACURE" and "DAROCUR" tradenames, specifically "IRGACURE" 184 (1-hydroxycyclohexyl phenyl ketone), 907 (2-methyl-1-[4-(methylthio)phenyl]-2-morpholino propan-1-one), 369 (2-benzyl-2-N,N-dimethylamino-1-(4-morpholinophenyl)-1-butanone), 500 (the combination of 1-hydroxy cyclohexyl phenyl ketone and benzophenone), 651 (2,2-dimethoxy-2-phenyl acetophenone), 1700 (the combination of bis(2,6-dimethoxybenzoyl)-2,4,4-trimethyl pentyl phosphine oxide and 2-hydroxy-2-methyl-1-phenyl-propan-1-one) and "DAROCUR" 1173 (2-hydroxy-2-methyl-1-phenyl-1-propane) and 4265 (the combination of 2,4,6-trimethylbenzoyldiphenyl-phosphine oxide and 2-hydroxy-2-methyl-1-phenyl-propan-1-one); photoinitiators available commercially from Union Carbide Chemicals and Plastics Co. Inc., Danbury, Conn. under the "CYRACURE" tradename, such as "CYRACURE" UVI-6974 (mixed triaryl sulfonium hexafluoroantimonate salts) and UVI-6990 (mixed triaryl sulfonium hexafluorophosphate salts); and the visible light [blue] photoinitiators, dl-camphorquinone and "IRGACURE" 784DC. Of course, combinations of these materials may also be employed herein.

Photoinitiators particularly suitable for use herein include ultraviolet photoinitiators, such as 2,2-dimethoxy-2-phenyl acetophenone (e.g., "IRGACURE" 651), and 2-hydroxy-2-methyl-1-phenyl-1-propane (e.g., "DAROCUR" 1173) and the ultraviolet/visible photoinitiator combination of bis(2,6-dimethoxybenzoyl-2,4,4-trimethylpentyl)phosphine oxide and 2-hydroxy-2-methyl-1-phenyl-propan-1-one (e.g., "IRGACURE" 1700), as well as the visible photoinitiator bis($\eta^5$-2,4-cyclopentadien-1-yl)-bis[2,6-difluoro-3-(1H-pyrrol-1-yl)phenyl]titanium (e.g., "IRGACURE" 784DC). LUCIRIN TPO, from BASF is another preferred photoinitiator. Typically, the photoinitiators will be employed in an amount of 0.5 to 10%, desirably 1 to 7% and more desirably 3–5% by weight of the composition.

The photocurable sealant compositions employed in the invention may also include an inhibitor of polymerization in an amount effective to give desired shelf stability to the composition. Suitable inhibitors are well known to those skilled in the art and include those described in the aforementioned patents which described anaerobic compositions. Metal chelators, such as ethylenediamine tetraacetate ("EDTA") and 1-hydroxyethylidine-1,1-diphosphonic acid ("HEDPA"), and quinone type inhibitors, such as hydroquinone, methyl hydroquinone, naphthaquinone and benzoquinone, are exemplary. Such inhibitors are typically employed at a level of 0.1–1.0% by weight of the composition.

The invention is illustrated by the following non-limiting example.

EXAMPLE

Using an application apparatus as shown in FIG. 3 with a spray head located 10 mm above the rotary table, Loctite 3102 was sprayed at a thickness of approximately 0.005" (0.127 mm), to the crimp area of a series of nutplates for a conventional oil filter housing which were successively mounted and rotated on the table. The sprayed nutplates were then passed twice through a Loctite Corp. Fusion F300 UV curing apparatus equipped with a 6 inch H+ bulb located approximately 3 inches (7.6 cm) above a conveyer belt moving at a belt speed of 3 feet/min (0.91 m/min), providing a total exposure time under the bulb of 10 seconds. The nutplates with cured sealant thereon were then used to prepare oil filters with a crimped joint between shell and nutplate in a conventional manner. The seals were determined to be acceptable by evaluating them in a dynamic cycle test that cycles the crimped oil filter assemblies from 100 psi to 250 psi (using oil to exert the pressure) three times per second for 250,000 cycles. This is an industry standard test used to audit the quality of oil filters.

The above example and disclosure are intended to be illustrative and not exhaustive. These examples and description will suggest many variations and alternatives to one of ordinary skill in this art. All these alternatives and variations are intended to be included within the scope of the claims, where the term "comprising" means "including, but not limited to". Those familiar with the art may recognize other equivalents to the specific embodiments described herein which equivalents are also intended to be encompassed by the claims. Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should be also taken as alternatively written in each singly dependent claim format which creates a dependency from a prior antecedent-possessing claim other than the specific claim listed in such dependent claim below.

What is claimed is:

1. A process for producing a sealed crimp joint between two substrates, each substrate having a predefined crimp area utilized to form the crimp joint, the process comprising
    a) applying a photocurable sealant composition to a portion of the crimp area of at least one of the substrates,
    b) irradiating the photocurable curable sealant in place on the substrate with energy effective to cure the sealant to an immobile state, and then
    c) forming a crimp joint between the two substrates utilizing the respective crimp areas thereof.
2. A process as in claim 1 wherein the photocurable sealant is applied with a sprayer, extruder, liquid film dispensing valve or screen printing.
3. A process as in claim 2 wherein the photocurable sealant has a viscosity in the range of 10 to 100,000 mPa.s.
4. A process as in claim 3 wherein said viscosity is in the range of 100 to 100,000 mPa.s.
5. A process as in claim 1 wherein the photocurable sealant is a (meth)acrylate based sealant.
6. A process as in claim 1 wherein the sealant is applied at a thickness of 0.001 inches to 0.020 inches (0.025 mm to 0.51 mm).
7. A process as in claim 6 wherein said thickness is from about 0.005 inches to about 0.006 inches (0.13 mm to 0.15 mm).
8. A process as in claim 1 wherein the two substrates, when joined, form a housing for an automotive fluid filter.
9. A process as in claim 1 wherein the two substrates when joined, form a housing for an oil filter.
10. A process as in claim 9 wherein one of the substrates is a housing shell and the other is a circular nutplate, and the sealant is applied to the crimp area of the nutplate as an annular ring.
11. A process as in claim 1 wherein after the sealant is applied and cured, but before the crimp joint is formed, the substrate having the cured sealant thereon is inspected to determine at least one of the presence, location, thickness or cure depth of the cured sealant.
12. A process as in claim 1 wherein the sealant, when cured, has a flexural modulus of about 120,000 psi or less.
13. A process as in claim 12 wherein said flexural modulus is in the range of from about 50 to about 90,000 psi.
14. A process as in claim 13 wherein said flexural modulus is in the range of from about 500 to about 60,000 psi.
15. A process as in claim 1 wherein the photocurable sealant is a photocurable (meth)acrylate, epoxy, vinyl ether, styryloxy, or thiol-ene based sealant.
16. A process as in claim 1 wherein the photocurable sealant comprises a compound providing an organic polymer backbone, a silicone polymer backbone or a mixture of any two or more thereof.
17. A process as in claim 1 wherein the photocurable sealant further comprises a colorant, fluorescent agent, phosphorescent agent or mixture of any two or more thereof.
18. A process as in claim 1 wherein, in the irradiation step b), the photocurable sealant is cured to the solid state through the depth thereof.
19. A process as in claim 1 wherein the sealant has a secondary cure mechanism effective to continue curing the sealant after the irradiation step b).
20. A crimp joined product produced by the process of claim 1.
21. An oil filter comprising a housing produced by the process of claim 9.

* * * * *